United States Patent [19]

Talgam et al.

[11] Patent Number: 4,914,581
[45] Date of Patent: Apr. 3, 1990

[54] METHOD AND APPARATUS FOR EXPLICITLY EVALUATING CONDITIONS IN A DATA PROCESSOR

[75] Inventors: Yoav Talgam, Tel Aviv, Israel; Mitch K. Alsup, Dripping Springs; James A. Klingshirn, Austin, both of Tex.

[73] Assignee: Motorola, Inc., Schaumburg, Ill.

[21] Appl. No.: 112,597

[22] Filed: Oct. 26, 1987

[51] Int. Cl.⁴ .................... G06F 7/38; G06F 15/16
[52] U.S. Cl. ........................ 364/200; 364/265; 364/265.4; 364/259; 364/259.2; 364/748; 364/736
[58] Field of Search ... 364/200 MS File, 900 MS File, 364/748, 736

[56] References Cited

U.S. PATENT DOCUMENTS

| | | | |
|---|---|---|---|
| 4,348,722 | 9/1982 | Gunter et al. | 364/200 |
| 4,509,116 | 4/1985 | Lackey et al. | 364/200 |
| 4,649,508 | 3/1987 | Kanuma | 364/748 |
| 4,683,546 | 7/1987 | Boney | 364/748 |
| 4,777,613 | 11/1988 | Shahan et al. | 364/748 |
| 4,779,218 | 10/1988 | Jauch | 364/736 |

Primary Examiner—Raulfe B. Zache
Assistant Examiner—Glenn Richman

[57] ABSTRACT

In a data processor, the conditions associated with an operand are evaluated only in response to the execution of a special instruction. The results of this evaluation is provided as a result operand and stored in a general purpose destination register. The evaluated conditions are each provided in discrete form, that is, unencoded, rather than in encoded form.

2 Claims, 1 Drawing Sheet

METHOD AND APPARATUS FOR EXPLICITLY EVALUATING CONDITIONS IN A DATA PROCESSOR

FIELD OF THE INVENTION

The subject invention relates generally to digital data processors and, more particularly, to a digital data processor capable of explicitly evaluating conditions existing therein.

BACKGROUND ART

In general, digital data processors generate as a result of executing most instructions one or more "condition codes" which reflect the state of selected "conditions" existing within the hardware comprising the processor as of the time the instruction is completed. For example, as a result of executing an arithmetic or logic instruction on one or more "data operands", the processor may evaluate such condition codes as Zero (Z) if the "result operand" was zero, Negative (N) if the result operand was negative, Overflow (O) if an overflow occured in the Arithmetic and Logic Unit (ALU) as a result of the particular operation, or Carry-out (C) if the ALU provided a carry-out signal as a result of the operation. Often, as a result of executing an instruction requiring the simple movement of a data operand to or from memory or between working registers, the processor will evaluate many of the same condition codes. Typically, the evaluated condition codes are automatically stored in a "condition code register" (CCR) or the like, whether or not they are actually needed. Usually, the contents of the CCR are used by conditional control transfer instructions, such as "branches" or "jumps", executed later in the program. Alternatively, the contents can be moved from the CCR into a working register or to memory using one of the data movement instructions. Thereafter, the individual code bits can be isolated and used as required. However, since the condition codes are often in an very primitive form, synthesis of a more useful logical predicate, such as Greater Than (GT) or Less Than or Equal (LE), usually requires the execution of one or more additional instructions.

Since the processor automatically evaluates the several conditions after the execution of substantially every instruction, the condition codes must be utilized by the very next instruction or not at all. Usually, this is an acceptable limitation, since the condition codes resulting from most operations are used, if at all, to control the following conditional branch instruction. On the other hand, in "pipelined" processors, this limitation becomes less acceptable as the number of stages in the pipeline increases. If the condition codes resulting from a particular operation must be used by more than just the next instruction, that next instruction must transfer the condition codes out of the CCR into a working register or into memory. Otherwise, the original operation must be repeated each time the condition codes are needed. In either event, one or more additional instructions must be executed to make the critical condition codes available when needed.

In some data processors having more than one type of execution unit (EU), the format and meaning of the condition codes for each unit are usually unique. While it is not uncommon to group all condition codes into a single CCR, that practice results in complex scheduling if the EU's have different execution times. It also limits the architectural freedom to change the "mix" of EU's. Additionally, each different type of EU usually requires a corresponding set of conditional branch instructions. This proliferation of instructions makes instruction decoding more difficult, and requires additional hardware to receive the codes, interpret each set of condition codes and control the execution of each branch instruction.

In some other data processors having multiple EU's, the evaluation of condition codes is not implicit, but rather occurs only in response to an explicit request. In some of these processors, a set of "compare and branch" instructions was defined, with the branch being conditioned upon the evaluation of a particular logical predicate. In other processors, a set of "set on condition" instructions are defined, with a result operand being set to the logical truth value of a specified logical predicate. Again, the resulting proliferation of instructions requires additional decode and control logic.

SUMMARY OF THE INVENTION

Accordingly, it is an object of the present invention to provide a data processor which simultaneously evaluates a plurality of conditions only in response to an explicit instruction to do so.

Another object of the present invention is to provide a processor in which conditions are evaluated in terms of a set of logical predicates.

Yet another object of the present invention is to provide a processor which provides the truth value of each of a set of logical predicates, evaluated using conditions existing within the processor, as respective bits of a result operand.

These and other objects are achieved in a data processor comprising an execution unit for executing each of a plurality of instructions, and for providing a result operand in response to executing at least one of the plurality of instructions; and a control unit for controlling the execution by the execution unit of each of the plurality of instructions. In accordance with the present invention, the processor includes condition evaluation logic for evaluation a set of conditions in the execution unit only in response to the execution of a selected one of the plurality of instructions, and the execution unit provides the evaluated set of conditions as the result operand.

DESCRIPTION OF THE INVENTION

Figure 1:
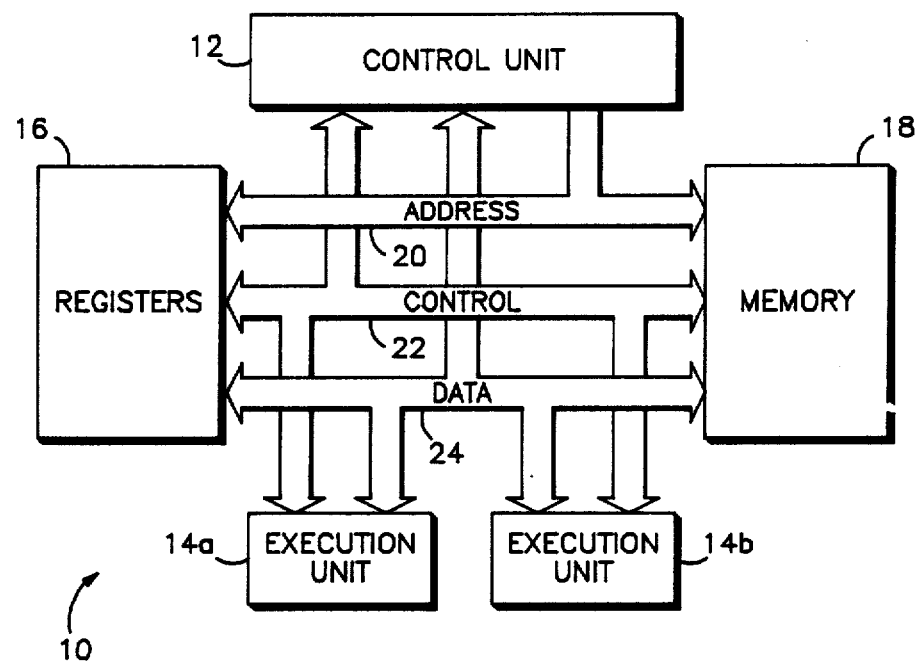
FIG. 1 illustrates in block diagram form, a data processor in which the present invention may be advantageously employed.

Shown in FIG. 1 is a data processor 10 comprising an control unit (CU) 12, a pair of execution units (EUs) 14a-14b, a set of registers 16 and a memory 18, which communicate via an address bus 20, a control bus 22 and a data bus 24. In general, programs, both supervisor and user, are stored in the memory 18 in the form of sequences of instructions. The CU 12 sequentially fetches the instructions from the memory 18 and dispatches each to an appropriate one of the EUs 14a-14b for execution. Depending upon the instruction, the selected EU 14a-14b performs a particular arithmetic or logic operation upon one or more input operands provided by selected "source" registers 16, and may return a result operand for storage in a selected "destination" register 16. Such result operands may be left in the respective register and used in subsequent operations, or moved to the memory 18 for longer term storage, as desired.

In addition to being significant, in and of themselves, certain characteristics of the result operands may be determined from the condition of the particular EU 14a-14b as of the time the operation was completed. For example, it is often convenient to know that the result operand was equal to zero (Z). Similarly, the sign (S) of the result operand is usually of interest. In some situations, it is quite useful to know if a carry-out (C) occured as a result of a particular arithmetic operation. Using such "condition codes", decisions can be made as to program flow, error conditions, and the like. However, by using these simple condition codes to evaluate more useful logical predicates, the decision process may be simplified.

In accordance with the present invention, condition evaluation is not "implicit", that is, neither of the EUs 14a-14b evaluates any condition(s) as a result of performing a normal arithmetic or logic operation. Instead, condition evaluation is "explicit", that is, an EU 14a-14b will evaluate conditions only in response to executing a "condition evaluation" (EVALUATE) instruction specific to that EU. In the preferred form, the evaluation consists of determining the truth value of a set of logical predicates. These values are then "packed" into respective bits of a result operand and returned to a specified destination register 16. Decisions can be made on the truth value of each logical predicate using simple "branch on bit value" instructions. Alternatively, one or more of the bits can be extracted and isolated for further processing or assignment.

In general, the EVALUATE instruction may take any of a number of forms. For example, if multiple EUs 14a-14b are present, a generic form may be as follows:

COMPARE:Sx,Sy,Dz;EU where:
Sx,Sy=pointers to the input operands to be evaluated, usually in registers;
Dz=a pointer to the destination of the result operand, usually a register; and
EU=a pointer to the particular one of the EUs 14a-14b selected to perform the evaluation.

If only a single EU is available, the form could be reduced to:

COMPARE:Sx,Sy,Dz where:
Sx,Sy=pointers to the input operands to be evaluated, usually registers;
Dz=a pointer to the destination of the result operand, usually a register.

A primitive EVALUATE instruction may take the following form:

EVALUATE:Sx,Dz where:
Sx=a pointer to the input operand to be evaluated, usually a register;
Dz=a pointer to the destination of the result operand, usually a register.

Of course, the primitive EVALUATE can be performed using the generic form if one of the input operands is made to be zero (0).

In general, each EU 14a-14b operates on operands of only a single type, for example, integer or floating point. However, the generic form is equally suitable for an EU 14a-14b capable of operating upon mixed operand types.

In the preferred form, an integer-type EVALUATE instruction evaluates a number of different logical predicates and returns the truth value of each as a respective bit of the result operand as follows:

| 31 – 12 | 11 | 10 | 9  | 8  | 7  | 6  | 5  | 4  | 3  | 2  | 1 0 |
|---------|----|----|----|----|----|----|----|----|----|----|-----|
| 0 – 0   | HS | LO | LS | HI | GE | LT | LE | GT | NE | EQ | 0 0 | where:
EQ: true (1) if and only if $Sx == Sy$
NE: true (1) if and only if $Sx != Sy$
GT: true (1) if and only if $Sx > Sy$
LE: true (1) if and only if $Sx <= Sy$
LT: true (1) if and only if $Sx > Sy$
GE: true (1) if and only if $Sx >= Sy$
HI: true (1) if and only if $Sx\ U> Sy$
LS: true (a) if and only if $Sx\ U<= Sy$
LO: true (1) if and only if $Sx\ U< Sy$
HS: true (1) if and only if $Sx\ U>= Sy$
U implies unsigned comparison.

Figure 2:
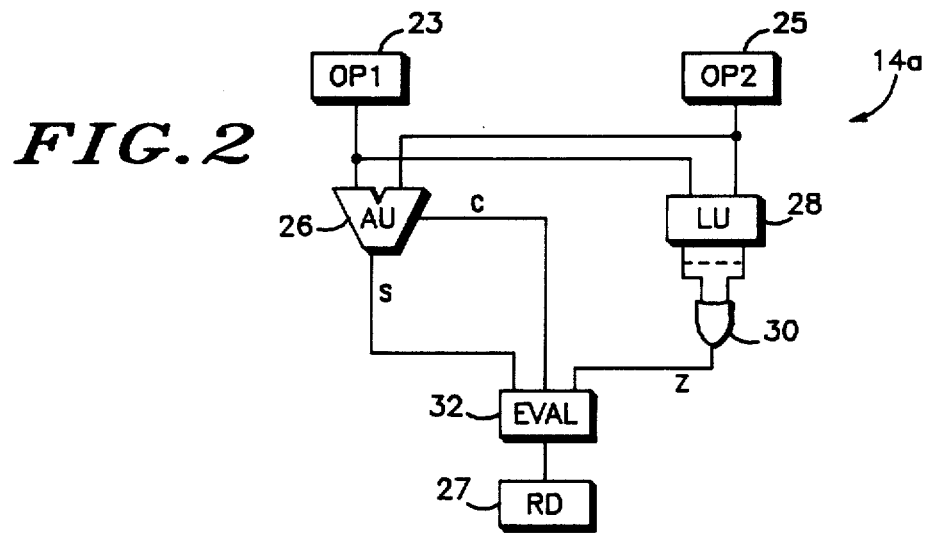
FIG. 2 illustrates a preferred implementation within the execution units of FIG. 1 of the EVALUATE instruction of the present invention.

Shown in FIG. 2 is a preferred embodiment of an integer EU 14a capable of executing either form of the EVALUATE instruction. In general, the first and second input operands, OP1 and OP2, respectively, are simultaneously input to both an Arithmetic Unit (AU) 26 and a Logic Unit 28. In the AU 26, both input operands are zero extended as required to the same width, say 32-bits. The extended operand OP2 is then subtracted from the extended OP1 to determine the sign (S) of the difference and if a carry-out (C) occurs. Simultaneously, in the LU 28, the input operands are bit-by-bit logical EXCLUSIVE ORed. The 32-bit output of the LU 28 is input into an OR gate 30, which will assert a Zero (Z) signal if the two operands are logically identical. Evaluation (EVAL) logic 32, implemented in either discrete logic or in a PLA, logically combine the C, S and Z signals as follows:

EQ==Z
NE==Z*
GT==S* & Z*
LE==S+Z
LT==S
GE==S*
HI==C* & Z*
LS==C+Z
LO==C
HS==C* where:
\* = > logical inverse
& = > logical AND
+ = > logical OR

In the preferred form, a floating-point-type EVALUATE instruction evaluates a number of different logical predicates and returns the truth value of each as a respective bit of the result operand as specified below. All arithmetic is performed in accordance with the IEEE P754 standard.

| 31 | 12 | 11 | 10 | 9 | 8 | 7 | 6 | 5 | 4 | 3 | 2 | 1 | 0 |
|---|---|---|---|---|---|---|---|---|---|---|---|---|---|
| 0 – 0 | | HS | LO | LS | HI | GE | LT | LE | GT | NE | EQ | CP | NC | where:

NC: true (1) if and only if Sx and Sy are not comparable

CP: true (1) if and only if Sx and Sy are comparable

EQ: true (1) if and only if $Sx == Sy$

NE: true (1) if and only if $Sx\ !=Sy$

GT: true (1) if and only if $Sx > Sy$

LE: true (1) if and only if $Sx <= Sy$

LT: true (1) if and only if $Sx < Sy$

GE: true (1) if and only if $Sx >= Sy$

HI: true (1) if and only if $Sy >= 0$, and $((Sx > Sy)\ OR\ (Sx < 0))$

LS: true (1) if and only if $Sy >= 0$, and $((Sx <= Sy)\ AND\ (Sx >= 0))$

LO: true (1) if and only if $Sy >= 0$, and $((Sx < Sy)\ AND\ (Sx > 0))$

HS: true (1) if and only if $Sy >= 0$, and $((Sx >= Sy)\ OR\ (Sx <= 0))$

Although the conditions which are of interest are related to one or more input operands, the EVALUATE instruction is not limited to such conditions. For example, in some EUs 14a-14b, other conditions which are unrelated to operands, such as parity, may be of interest. If desired, these operand-independent conditions may be evaluated at the same time the operand-dependent conditions are evaluated and provided in those bits, if any, of the result operand not dedicated to the operand-dependent conditions.

Although the present invention has been disclosed in a preferred form, various changes and modifications may be made without departing from the spirit and scope of the present invention.

We claim:

1. A method for comparing a first operand to a second operand comprising the steps of:

EXCLUSIVE ORing the first operand and the second operand;

subtracting the first operand from the second operand to provide a signed difference;

generating a first set of condition codes comprising:

ZERO (Z) if the first and second operands are logically identical

CARRY (C) if the second operand is larger than the first operand; and

SIGN (S) if the difference is positive; and logically combining the first set of condition codes to produce a second set of condition codes, whereby said second set of condition codes represents a logical truth value of the combination of each of a number of different logical predicates, said second set of condition codes comprising:

Equal (EQ) if the first operand is equal to the second operand;

Not Equal (NE) if the first operand is not equal to the second operand;

Greater Than (GT) if the first operand is greater than the second operand;

Greater than or Equal (GE) if the first operand is greater than the second operand;

Less than or Equal (LE) if the first operand is less than or equal to the second operand; and providing the second set condition codes, as respective bits of a data operand, to any one of a predetermined number of data registers, whereby execution of a subsequent explicit evaluate instruction will not overwrite a previously generated second set of condition codes.

2. In a data processor having an execution unit capable of executing an explicit evaluate instruction:

first means for EXCLUSIVE ORing a first operand and a second operand;

second means for subtracting the first operand from the second operand to provide a signed difference;

third means, coupled to said first and second means, for generating a first set of condition codes comprising:

ZERO (Z) if the first and second operands are logically identical

CARRY (C) if the second operand is larger than the first operand; and

SIGN (S) if the difference is positive; and fourth means, coupled to said third means, for logically combining the first set of condition codes to produce a second set of condition codes, whereby said second set of condition codes represents a logical truth value of the combination of each of a number of different logical predicates, said second set of condition codes, comprising:

Equal (EQ) if the first operand is equal to the second operand;

Not Equal (NE) if the first operand is not equal to the second operand;

Greater Than (GT) if the first operand is greater than the second operand;

Greater than or Equal (GE) if the first operand is greater than the second operand;

Less than or Equal (LE) if the first operand is less than or equal to the second operand; and fifth means for providing the second set of condition codes, as respective bits of a data operand, to any one of a predetermined number of data registers, whereby execution of a subsequent explicit evaluate instruction will not overwrite a previously generated second set of condition codes.

* * * * *